(12) United States Patent
von Haden et al.

(10) Patent No.: US 9,164,997 B2
(45) Date of Patent: Oct. 20, 2015

(54) RECOGNIZING CLOUD CONTENT

(75) Inventors: Kyle M. von Haden, Mill Creek, WA (US); Jennifer H. Hwang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 333 days.

(21) Appl. No.: 13/354,055

(22) Filed: Jan. 19, 2012

(65) Prior Publication Data
US 2013/0191339 A1  Jul. 25, 2013

(51) Int. Cl.
*G06F 17/30* (2006.01)
*G06F 17/22* (2006.01)

(52) U.S. Cl.
CPC ...... *G06F 17/3007* (2013.01); *G06F 17/30946* (2013.01); *G06F 17/2205* (2013.01); *G06F 17/30165* (2013.01)

(58) Field of Classification Search
CPC .......... G06F 17/2205; G06F 17/30165; G06F 17/3007; G06F 17/30946
USPC ................................................. 707/600, 638
See application file for complete search history.

(56) References Cited

U.S. PATENT DOCUMENTS

| | | | |
|---|---|---|---|
| 7,493,329 B2 | 2/2009 | McMullen et al. | |
| 7,949,711 B2* | 5/2011 | Chang et al. | 709/205 |
| 8,095,521 B2 | 1/2012 | Chan et al. | |
| 8,515,902 B2* | 8/2013 | Savage | 707/608 |
| 8,880,474 B2* | 11/2014 | Mason et al. | 707/649 |
| 2004/0003039 A1 | 1/2004 | Humphrey et al. | |
| 2008/0307053 A1 | 12/2008 | Mitnick et al. | |
| 2009/0005040 A1* | 1/2009 | Bourne | 455/435.1 |
| 2009/0240935 A1 | 9/2009 | Shukla | |
| 2009/0254590 A1 | 10/2009 | Shlomai et al. | |
| 2009/0300071 A1 | 12/2009 | Arcese et al. | |
| 2010/0125595 A1* | 5/2010 | Iizuka et al. | 707/758 |
| 2010/0332479 A1* | 12/2010 | Prahlad et al. | 707/741 |
| 2011/0022642 A1* | 1/2011 | Demilo et al. | 707/805 |

(Continued)

FOREIGN PATENT DOCUMENTS

WO  2011150132 A1  12/2011

OTHER PUBLICATIONS

Smith, Michael, "Mobile Platform Folder Synchronization and Offline Synchronization", Nov. 29, 2011, U.S. Appl. No. 61/564,425 (Specification and Drawings).*

(Continued)

*Primary Examiner* — Thanh-Ha Dang
(74) *Attorney, Agent, or Firm* — Steve Crocker; Danielle Johnston-Holmes; Micky Minhas

(57) ABSTRACT

Recognizing cloud content techniques are described herein. A designated storage location for cloud content corresponding to a service is registered locally at a device. Files stored in association with the registered storage location may be recognized as cloud content of the corresponding service. The recognized cloud content may be handled in various ways to customize the user experience and tailor interaction with cloud content. For example, icons or other visual identifiers may be used within device, operating system and/or application user interfaces to represent an association of files with a particular service based on recognition of the files as cloud content. Additionally, a registered storage location for a device may be employed to obtain relative paths to files that may be used to roam file activity lists between different devices.

20 Claims, 7 Drawing Sheets

(56) References Cited

U.S. PATENT DOCUMENTS

| | | | |
|---|---|---|---|
| 2011/0066668 A1* | 3/2011 | Guarraci | 707/831 |
| 2011/0072059 A1* | 3/2011 | Guarraci | 707/823 |
| 2011/0196892 A1* | 8/2011 | Xia | 707/769 |
| 2011/0238458 A1* | 9/2011 | Purcell et al. | 705/7.27 |
| 2011/0252071 A1* | 10/2011 | Cidon | 707/802 |
| 2011/0302194 A1 | 12/2011 | Gonzalez et al. | |
| 2011/0314044 A1 | 12/2011 | Dumais et al. | |
| 2012/0023410 A1* | 1/2012 | Roth et al. | 715/737 |
| 2012/0054253 A1* | 3/2012 | Guarraci | 707/825 |
| 2012/0079095 A1* | 3/2012 | Evans et al. | 709/224 |
| 2012/0101995 A1* | 4/2012 | Agetsuma et al. | 707/644 |
| 2012/0185413 A1* | 7/2012 | Felter | 705/400 |
| 2012/0192064 A1* | 7/2012 | Antebi et al. | 715/255 |
| 2013/0013560 A1* | 1/2013 | Goldberg et al. | 707/634 |
| 2013/0031192 A1* | 1/2013 | Caspi | 709/206 |
| 2013/0067303 A1* | 3/2013 | Kantor et al. | 715/205 |
| 2013/0097115 A1* | 4/2013 | Savage | 707/610 |
| 2013/0138608 A1* | 5/2013 | Smith | 707/610 |

OTHER PUBLICATIONS

"Introduction to Microsoft Sync Framework File Synchronization Provider", Retrieved at http://msdn.microsoft.com/en-us/sync/bb887623, Oct. 2009, pp. 6.

Villinger, Sandro, "That Syncing Feeling: Choosing the Best File Synchronization Tools", Retrieved at <<http://h30565.www3.hp.com/t5/Feature-Articles/That-Syncing-Feeling-Choosing-the-Best-File-Synchronization/ba-p/113>>, Sep. 6, 2011, pp. 7.

"International Search Report", Mail Date: Apr. 25, 2013, Application No. PCT/US2013/021616, Filed date: Jan. 16, 2013, pp. 09.

"Supplementary Search Report Issued in European Patent Application No. 13738961.5", Mailed Date: May 29, 2015, 5 Pages.

"International Preliminary Report on Patentability", Application No. PCT/US2013/021616, Jul. 31, 2015, 6 pages.

* cited by examiner

500

502
Establish a designated location for synched files associated with a collaboration service in local storage at a computing device 504
Track activities corresponding to the synched files on the computing device using relative paths to the files at the designated location 506
Roam a list of activities including the relative paths of the synched files to an other computing device to enable the other device to match the activities to corresponding synched files located at specific locations in local storage of the other computing device.

Fig. 5

RECOGNIZING CLOUD CONTENT

BACKGROUND

File storage and synchronization solutions available to help users manage documents and other content, store content "in the cloud," and access cloud content from various devices over a network are becoming increasingly more common. Traditionally, applications and file systems do not make distinctions between locally maintained content (e.g., local files) and cloud content (e.g., synched files) in terms of how the files are handled and/or presented to a user. Files having the same type, such as multiple .txt files, may be handled substantially in the same manner by a device without regard to whether the files are kept locally or synchronized with other devices. Accordingly, adequate mechanisms do not currently exist to recognize cloud content, associate cloud content with corresponding providers, and/or enable customized handling for cloud content.

SUMMARY

Recognizing cloud content techniques are described. In an implementation, a path name or other suitable identifier of a designated storage location for cloud content corresponding to a service is registered locally at a device. Files stored in association with the registered storage location are recognized as cloud content of the corresponding storage service. Recognized cloud content may then be handled in various ways to customize the user experience. For example, icons or other visual identifiers may be used within device, operating system and/or application user interfaces to represent an association of files with a particular service based on recognition of the files as cloud content. Additionally, a registered storage location for a device may be employed to obtain relative paths to files that may be used to roam file activity lists between different devices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the following discussion.

FIG. 5 is a flow diagram depicting an example procedure to roam activities for recognized cloud content in accordance with one or more embodiments.

DETAILED DESCRIPTION

Overview

Recognizing cloud content techniques are described. In an implementation, a path name or other suitable identifier of a designated storage location for cloud content corresponding to a service (e.g., a file collaboration and/or synchronization service) is registered locally at a device. For example, a path name may be registered using a designated data object including but not limited to, a dynamic link library (dll) entry, database records and/or fields, a text file, a mark-up language document, a registry entry or other suitable data object/parameter that is designated for registering such storage locations. The registration may occur when a file synchronization application is installed at a client. Files stored in association with the registered storage location, such as in a folder or subfolder under the registered path, are recognized as cloud content of the corresponding service. For example, applications of a device may be configured to look-up registered paths via designated data objects that are designated for registration of file collaboration and/or synchronization services. The recognized cloud content may then be handled at the device in various ways to customize the user experience. For example, icons or other visual identifiers may be used within various device, operating system, and/or application user interfaces to represent an association of a file with a particular service based on recognition of the file as cloud content.

Additionally, a registered storage location for a device may be employed by an application to obtain relative paths to corresponding files that may be used to track activities with the files in an activity list. Activity lists that associate relative paths for cloud content with different activities may be roamed between different devices. At each individual device, a respective registered path may be combined with the relative paths to render an activities list having constructed paths that correctly reference locally stored versions of synchronized cloud content.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures. Next, an example user interface to enable interaction with recognized cloud content is described. Lastly, an example system and components of the system are discussed that may be employed to implement embodiments of the techniques described herein.

Example Environment

Figure 1:
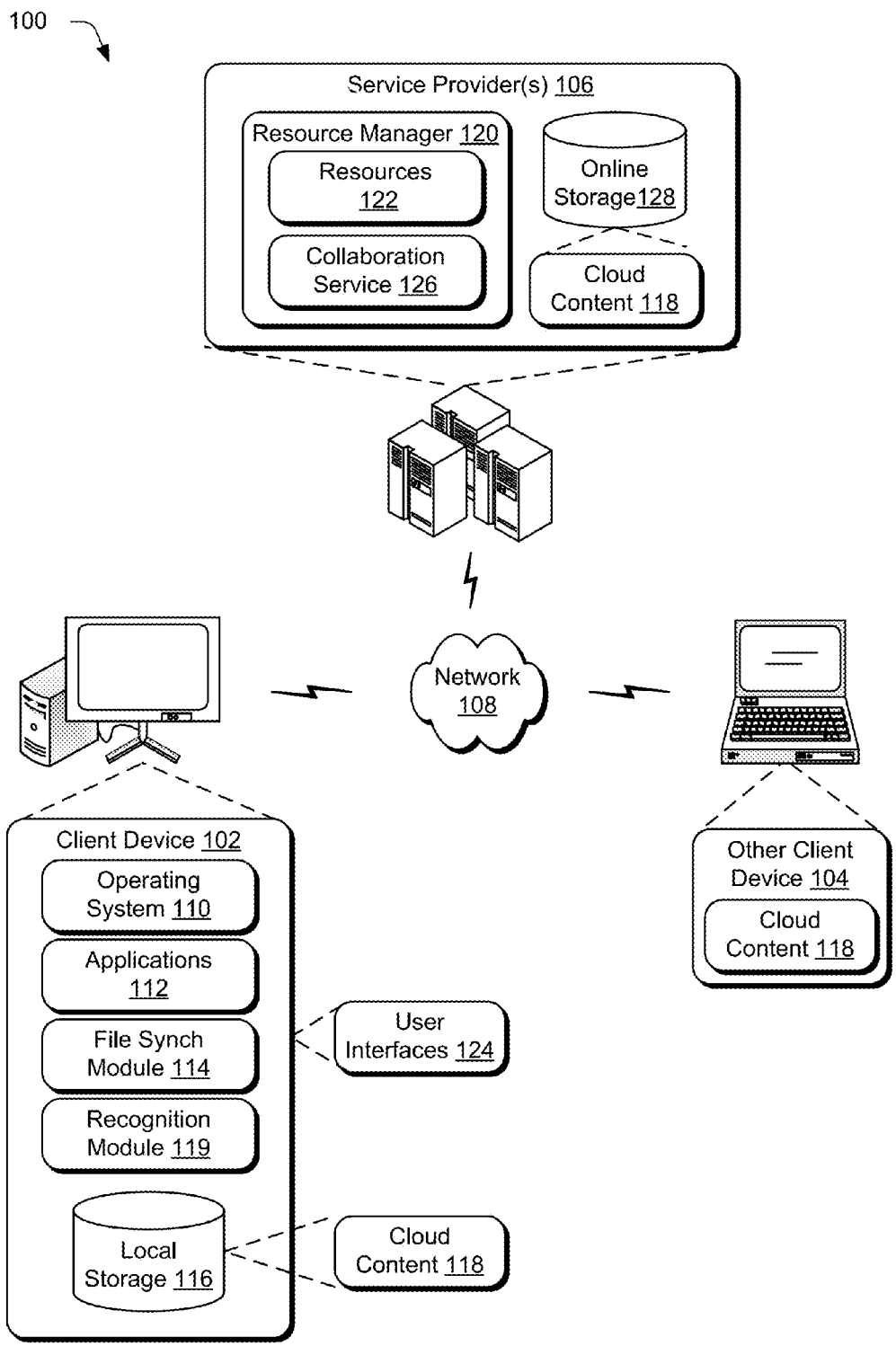
FIG. 1 is an illustration of an example operating environment that is operable to employ techniques for recognizing cloud content.

FIG. 1 is an illustration of an environment 100 in an example implementation that is operable to employ techniques described herein. The illustrated environment 100 includes a client device 102, an other client device 104, and a service provider 106 that are communicatively coupled via a network 108. The client device 102, other client device 104, and service provider 106 may be implemented by one or more computing devices and also may be representative of one or more entities.

A computing device may be configured in a variety of ways. For example, a computing device may be configured as a computer that is capable of communicating over the network 108, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, hand-held game consoles). Additionally, although a single computing device is shown in some instances, the computing device may be representative of a plurality of different devices, such as multiple servers of the service provider 106 utilized by a business to perform operations, and so on. Further examples of computing systems and devices suitable to implement techniques described herein are described below in relation to FIG. 7.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

The client device 102 is further illustrated as including an operating system 110. The operating system 110 is configured to abstract underlying functionality of the underlying device to applications 112 that are executable on the client device 102. For example, the operating system 110 may abstract processing, memory, network, and/or display functionality such that the applications 112 may be written without knowing "how" this underlying functionality is implemented. The application 112, for instance, may provide data to the operating system 110 to be rendered and displayed by a display device as illustrated without understanding how this rendering will be performed. A variety of applications 112 typically associated with client devices are contemplated including, but not limited to, a productivity suite that integrates multiple office productivity modules, a web browser, games, a multi-media player, a word processor, a spreadsheet program, a photo manager, and so forth.

The client device 102 is also illustrated as including a file synch module 114. The file synch module 114 represents client-side functionality to enable various synchronization of various files over the network 108. For example, the client device 102 may include local storage 116 that may be used to store local files as well as cloud content 118 the may be synchronized with other devices (e.g., "synched files"). The file synch module 114 may operate to connect to a service provided by the service provider 106 to perform file synchronization and related operations. By way of example, cloud content 118 is shown in FIG. 1 as being associated with both the client device 102 and other client device 104. In this context, cloud content 118 represents local versions of files that are maintained in respective local storage 116 of multiple different devices and that may be synchronized across the multiple different devices via file synch modules 114 deployed to the devices. The file synch module 114 may be provided as a standalone application as illustrated and/or as a component of another application.

Additionally, the client device 102 may include a recognition module 119 configured to implement techniques for recognizing cloud content and handling recognized cloud content accordingly as described herein. As illustrated, the recognition module 119 may be provided as a standalone application that various applications 112 may make use of to recognize cloud content. In addition or alternatively, the recognition module 119 may be implemented as a component of another application, such as being a component of a word processor or other desktop applications. Further, although illustrated separately, the functionality of recognition module 119 may be combined with the file synch module 114 in at least some embodiments.

The service provider 106 is depicted as storing a resource manager 120 that represents functionality operable by the service provider 106 to manage various resources 122 that may be made available over the network 108. For example, various resources 122 may be provided via webpages or other user interfaces 124 that are communicated over the network for output by one or more clients via a web browser or other client application. The resource manager 120 may manage access to the resources 122, performance of the resources, and configuration of user interfaces 124 to provide the resources 122, and so on. The service provider 106 may represent one or more server devices used to provide the various resources 122.

Generally, resources 122 made accessible by a service provider 106 may include any suitable combination of services and/or content typically made available over a network by one or more providers. Some examples of services include, but are not limited to, a search service, an email service, an instant messaging service, an online productivity suite, and an authentication service to control access of clients to the resources 122. Content may include various combinations of text, multi-media streams, documents, application files, photos, audio/video files animations, images, web pages, web applications, device applications, content for display by a browser or other client application, and the like.

One particular example of a resource 122 that may be provided by a service provider 106 is a collaboration service 126 as depicted in FIG. 1. The collaboration service 126 is representative of functionality operable to provide and manage online storage 128 that may be allocated to user accounts associated with the service provider 106. The online storage 128 provides users with storage "in the cloud" for cloud content 118 such as documents, application files, photos, mobile uploads, and audio/video files so user may access their content items from anywhere over the network 108, and share content to collaborate with others. The collaboration service 126 also enables users to synchronize files across multiple different devices designated by the users. Multiple collaboration services provided by third parties (e.g., other providers) may also provide respective storage and file synchronization. Thus, cloud content 118 may be synchronized across multiple devices via different collaboration services through interaction with corresponding file synch modules 114 deployed to client devices.

As represented in FIG. 1, respective versions of files corresponding to cloud content 118 that is associated with a particular collaboration service 126 may be stored locally by each client device in local storage 116. In an implementation, the collaboration service 126 is also configured to store respective versions of the files in online storage 128 for online access in addition to storing the content locally at each device.

A service provider 106 may also store profile data in association with client accounts. The profile data associated with a client account may describe behaviors and activities with files, user preferences, custom templates/settings, and so forth for one or more applications. Profile data maintained "in the cloud" may be roamed between devices and applied to customize applications accordingly when a client is authenticated to a corresponding account. This may include roaming pinned items and activity lists as described in greater detail in relation to the following figures. A single service provider 106 may provide a collaboration service 126 in addition to enabling roaming for activities related to cloud content. Further, the service provider 106 may provide a roaming service that may be used to enable activity roaming for multiple collaboration services available from different providers including the service provider and/or third parties. Accordingly, techniques for recognizing cloud content described herein may be employed with collaboration services provided by third parties as well as by the same service/service provider that enables activity roaming for applications.

In at least some embodiments, clients may access the collaboration service 126 and other resources 122 provided by a service provider 106 through client/user accounts to which the clients are authenticated. For instance, to access resources 122, a client device may provide a username and password that is authenticated by an authentication service. When the authentication is successful (e.g., the client "is who they say they are"), the authentication service may pass a token (or other suitable authentication identifier/secret) to enable access to corresponding resources. A single authentication may correspond to one or more resources, such that authentication to a single account by a "single sign-on" may provide access to individual resources, resources from multiple service providers 106, and/or to an entire suite of resources available from a service provider 106.

Figure 2:
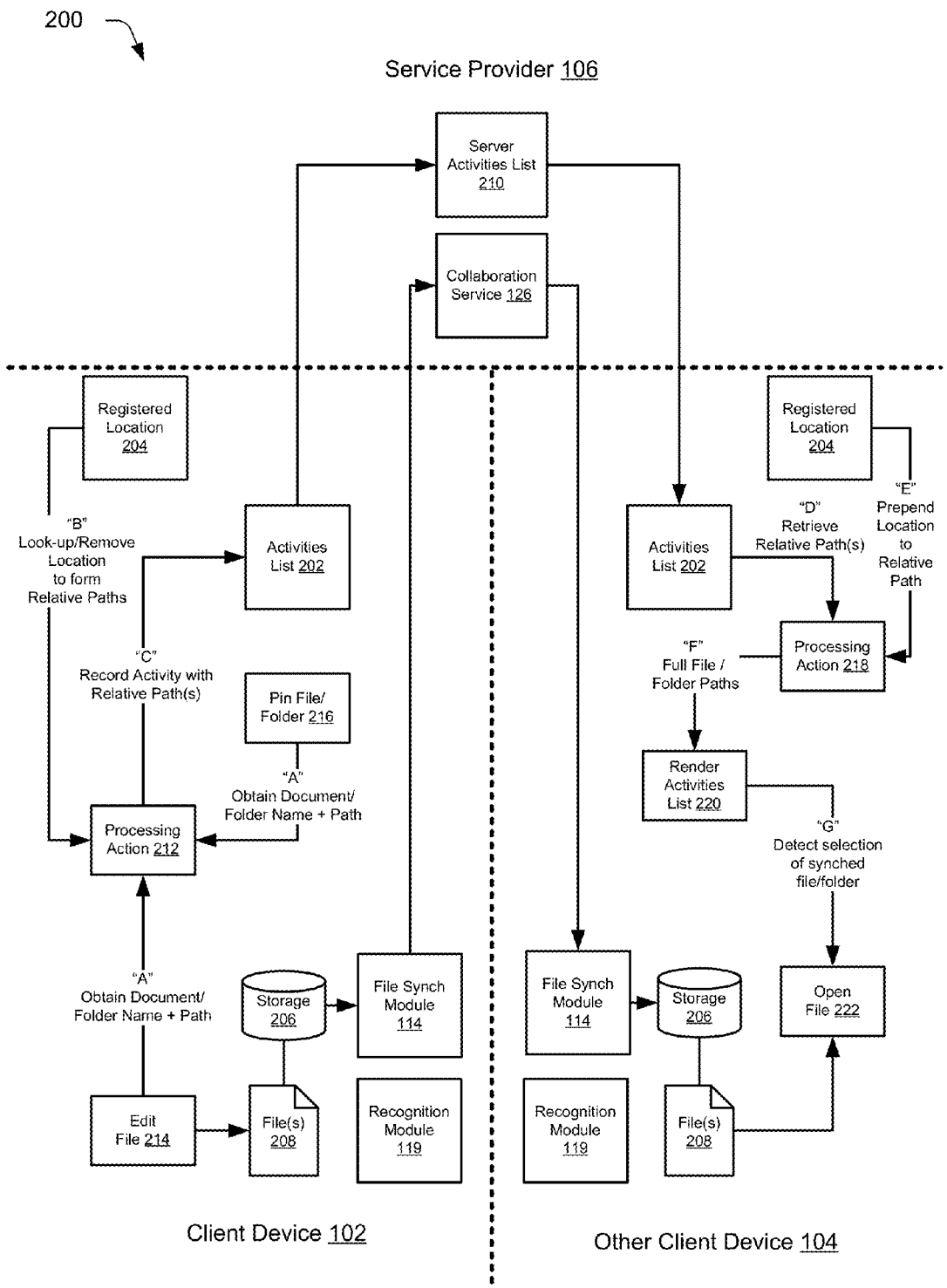
FIG. 2 is a diagram depicting some example scenarios for recognizing and handling cloud content in accordance with one or more embodiments.

To further illustrate techniques for recognizing cloud content, consider now FIG. 2, which depicts a diagram showing some example scenarios for interaction with cloud content, generally at 200. Here, the client device 102 and other client device 104 are each illustrated as including a file synch module 114, recognition module 119, an activities list 202, a registered location 204 for cloud content, and storage 206 that may be used to store various files 208 locally. The service provider 106 is depicted as including a collaboration service 126 and a server activities list 210. In different embodiments, the collaboration service 126 and a roaming service configured to manage the server activities list 210 and roam activities between devices may be implemented by the same service provider 106 or by different providers.

Generally speaking the registered location 204 for a device represents a top level storage location designated for storage of files that correspond to a particular collaboration service 126. Files, directories, and folders that are arranged logically under the registered location 204 may automatically be recognized as cloud content associated with the particular collaboration service 126. A location may be registered in any suitable way and different locations may be designated on different devices for the same collaboration service.

In one approach, the recognition module 119 represents functionality of a client operable to register a location for files when a file synch module 114 is installed, when a corresponding collaboration service is activated for use on the device and/or with a particular application, when corresponding files are processed, or otherwise. In general, the registered location 204 is recorded to a designated data object that can be referenced by applications to obtain the registered location 204. This provides an infrastructure that collaboration services 126 from different providers may take advantage of to register their services and thereby enable custom interactions and roaming of activities across devices for cloud content within applications.

More particularly, applications that support techniques described herein can be configured to look-up registered locations 204 for one or more collaboration services via designated data objects. In but one example, a file system registry or other comparable file system configuration and settings mechanism may be employed in an implementation to register locations. Accordingly, an application may look-up a particular registry entry (e.g., key-value pair) assigned to a collaboration service to obtain a corresponding registered location 204 for the service. A variety of other data objects and techniques may also be designated to store a registered location 204. By way of example and not limitation, registered locations 204 may be implemented as file system configuration and settings entries/values, database records, dynamic link library (dll) values, a text file, a mark-up language document, and/or other suitable data objects or parameters that are designated for registering such storage locations.

Registrations may also include service identifiers to distinguish different services from one another, such as a short service name or a numeric ID. The service identifiers enable multiple locations and/or collaboration service to be registered on a particular device. Devices may also employ the service identifiers to match roamed information to appropriate services and corresponding registered locations, further details of which can be found later in this document.

Thus, a file system location such as "C:/Robyns_Files/CService" may be registered for the client device 102 and a different location such as "D:/Program_Files/Work_docs/CService may be registered for the other client device 104. A user may be prompted to select the location during an install sequence for a particular collaboration service, which causes a path to the location to be registered. Applications may be configured to look-up the registered location via the recognition module 119 and associate files that fall under this location with a corresponding service. This may include various files, folders, and subfolders that may be logically arranged in a file hierarchy under the registered location. In other words, applications may reference registered locations 204 to recognize cloud content that corresponds to collaboration services.

Once an application recognizes content as cloud content, the content may be handled in various ways to customize the user experience and/or provide custom interaction with the cloud content. This includes providing indications of cloud content throughout the device user experience, tracking and synching activities related to cloud content between devices, selectively enabling cloud content related notices, options, and other functionality within applications, and so forth. For example, file icons and folders, lists of recently used documents, favorites list, pinned documents, links and/or other references to documents presented within an application user interface may be rendered with visual indications to associate the documents with corresponding services. In another example, a prompt to install a particular collaboration service at a device may be output when cloud content corresponding to a particular collaboration service that is not already installed on the device is recognized. Additional details regarding these and other examples are discussed in relation to the example user interface of FIG. 6 below.

Moreover, relative paths to the documents and/or folders that fall under a registered location may be obtained, associated with file related activities, and roamed for use by other devices. This may occur by storing activities lists as profile data corresponding to client accounts to make the lists accessible across devices. Relative paths are employed to make the roamed activities independent of particular storage locations/paths that may be used by different devices.

Consider a text document "resume.txt" that is stored locally on the client device 102 in the above example at a location having a full path of "C:/Robyns_Files/CService/job_search/resume.txt. A relative path to a document can be constructed by removing the registered location from the full path for the document. In this example, the relative path "/job_search/resume.txt" may be formed. The relative path may be associated with file related activities such as a list of recently used documents, a list of items pinned to an application user interface and/or menu, favorite items, and so forth. Now, the relative path(s) and activities may be roamed to the other devices, such as to the other client device 104 as depicted in FIG. 2.

In implementation, the relative path may also be associated with or include a service identifier, a short name for the collaboration service like "CS", a numeric ID such as "22," and so forth. Other metadata may also be associated with a relative path including but not limited to an icon or other visual indicator to use with items from the service, a path identifier to support multiple paths for a single service, a uniform resource locator (URL) for the service to provide a link to access help, install the service if appropriate, manage settings, and so forth. The service identifier may be implemented as a separate parameter or data field that is associated with the relative path. In another approach, the path may be configured to include the service identifier. For example, the service identifier may be inserted at the beginning of the relative path. For the above examples, this approach forms relative paths such as "CS/job_search/resume.txt" or "22/job_search/resume.txt." In this case, the relative path is created by replacing the registered location with a corresponding service identifier.

At a device that receives data associated with roamed paths, such as the other client device 104, full paths to corresponding local versions of documents may be constructed by adding (e.g., pre-pending) the registered location 204 for the device to the relative paths. If a service identifier is included in the path, the service identifier may be replaced by the registered location 204 to form the full path. For instance, continuing the preceding example, a path "D:/Program_Files/Work_docs/CService/job_search/resume.txt" for the text file may be constructed at the other client device 104 by combining the device specific registered path "D:/Program_Files/Work_docs/CService" with the relative path "/job_search/resume.txt," or, if appropriate, by replacing a service identifier (e.g., "CS", "22", etc.) with the registered path. The constructed path may then be used in various ways within applications and user interfaces of the device to reference and/or properly link to a locally stored version of the text document.

Thus, various interaction with files 208 at a device may be tracked and synched between devices using registered locations specific to different devices and relative paths used for roaming activities as just described. A few illustrative scenarios are depicted in FIG. 2 including some example acts that are designated using respective letters and may be implemented by the recognition module 119, file synch module 114, or otherwise. For instance, the recognition module 119 may be configured to monitor, detect, and track various activities related to files 208, which may involve various actions for processing files and folders. As shown in relation to the client device 102 in FIG. 2, when a processing action 212 is performed on a file, the action is detected and act "A" obtains the file/folder name and the full path for the file to associate with the activity. Act "B" looks-up the registered location 204 and removes the location/path from the full path that is obtained to construct a corresponding relative path. The relative path may also be associated with or constructed to include a service identifier as described above. Now, Act "C" uses the relative path to record the activity in association with the corresponding file. As shown, data matching relative paths for files to activities may be written to an activities list 202 of the client device 102.

As mentioned, a variety of different activities with cloud content and other files are contemplated. By way of example, FIG. 2 illustrates an edit file 214 action in which changes are made to a file 208. In this scenario, the file may be updated, stored locally, and synched via the file synch module 114 and collaboration service. In addition, the activities list 202 may be updated with a reference to the edited file to record the interaction with the file, such as by adding the file to a list of recently used documents and/or recording the file edits using a relative path. FIG. 2 also illustrates a pin file/folder action 216 in which an item is pinned to a location within an application user interface such that a representation of the item and/or a link to the item is made available in the location whenever the application user interface is rendered, so long as the item remains "pinned." Thus, links to "pinned" files may be persistently available within a user interface of a particular application. The activities list 202 may be updated to reflect the pinned item, such as by adding the file to a pinned items list using a relative path. In this way, the pinned items may be roamed to other devices. Other file interactions are also contemplated such as saving, copying, moving, creating a file, adding an item to a favorites list, and so forth.

Accordingly, the activities list 202 is representative of data recorded in relation to different kinds of activities that enables roaming of the activities between different devices. For instance, the activities list 202 can include one or more of a recently used documents list, a favorites list, and a pinned items list, to name a few examples. The activities list 202 may combine activities associated with both cloud content (e.g., synched files) and local content that is not synched with other devices. Relative paths may be employed for cloud content to make the activities list 202 independent of device specific paths. Service identifier may be incorporated with the list items to distinguish between different services. As such, the activities list 202 having relative paths for cloud content may be roamed from device to device.

In some embodiments, the collaboration service 126 maintains a server activities list 210 that may be updated to reflect activities across multiple devices. For example, the server activities list 210 may be stored as profile data associated with a client account. Individual devices may authenticate to the client account and synchronize local activities lists 202 with the server activities list 210. For example, as shown in relation to the other client device 104 in FIG. 2, a corresponding activities list 202 may be downloaded or otherwise synchronized to reflect roamed activities. Various processing actions 218 may cause the other client device 104 to output a user interface or portion of a user interface configured to present activities with files 208 including roamed activities associated with cloud content.

Act "D" retrieves activities associated with relative paths from activities list 202, which may be used to generate full paths for the other client device 104. To render a device specific activities list, the registered location 204 of the other client device 104 is retrieved and act "E" prepends the path for the registered location to relative paths of the activities list 202 to form full paths corresponding to versions of the files 208 at the other client device 104. Act "F" uses the full file/folder paths that are constructed to render an activities list 220 for the other client device 104. Activities list 220 may also combine roamed items for cloud content with items for local files that are not synched/roamed. Here, the rendered activities list includes appropriate representations and links to various locally stored versions of files 208 including some representation/links for roamed items.

Accordingly, act "G" may detect a selection of a synched file/folder from the rendered activities list, which causes an application to open the appropriate file at 222 using the constructed path. In this manner various activities associated with cloud content may be roamed between devices used to interact with the content.

Having considered an example environment and scenarios, consider now a discussion of some example procedures for recognizing cloud content in accordance with one or more embodiments.

Example Procedures

The following discussion describes recognizing cloud content techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the environment 100 of FIG. 1 and the diagram 200 of FIG. 2. In at least some embodiments, the procedures may be performed by a suitably configured computing device, such as a client device that includes or otherwise makes use of a file synch module 114 and/or a recognition module 119.

Figure 3:
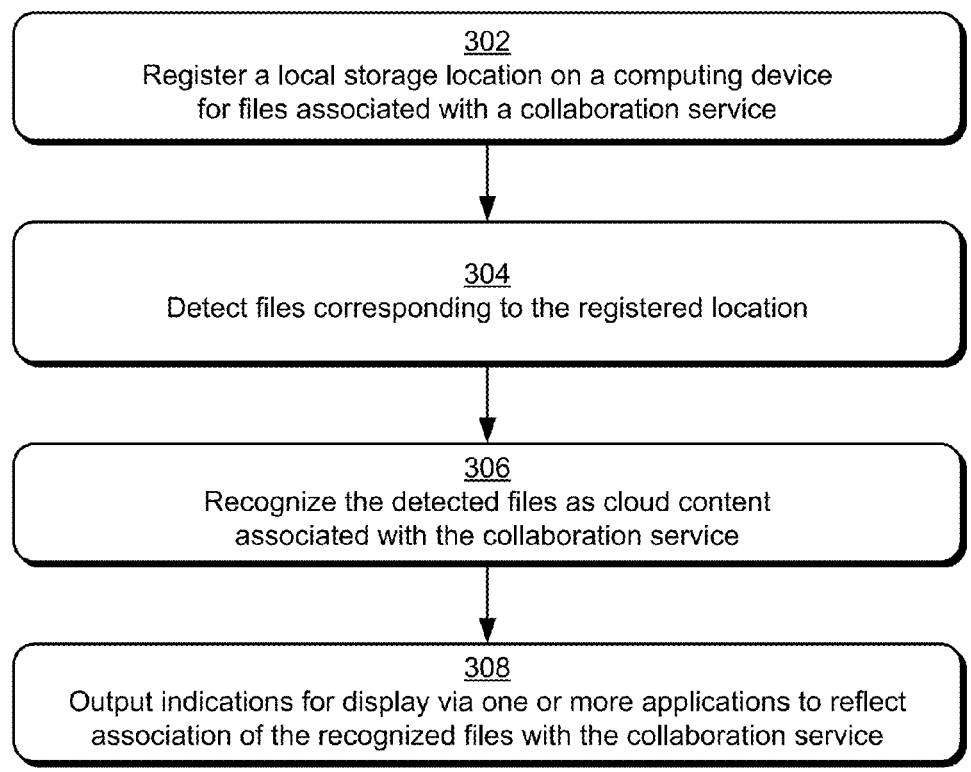
FIG. 3 is a flow diagram depicting an example procedure to output visual indications for recognized cloud content in accordance with one or more embodiments.

FIG. 3 is a flow diagram depicting a procedure 300 in which cloud content is recognized and associated with corresponding identifiers. A local storage location is registered on a computing device for files associated with a collaboration service (block 302). A device specific location may be registered using a suitable data object as described previously. The registered location provides a top level path for files associated with a particular collaboration service. Thus, the data object acts as a designated place where a service can store a path and applications may obtain the path to recognize and treat corresponding files as synched cloud content from the service.

It should be noted that multiple different collaboration services may be registered on a single device. Additionally, multiple paths corresponding to the same collaboration service may also be registered. In this case, each path may be related to corresponding paths on other devices using common identifiers. The identifiers are the same across devices even though the paths associated with the same identifier on different devices may be different. The identifiers enable matching of related paths across different devices.

Files are detected that correspond to the registered location (block 304) and the detected files are recognized as cloud content associated with the collaboration service (block 306). For example, a productivity suite, word processor, or other application of a device may operate to render files at least some of which are cloud content. Various interactions with files that occur via applications may be detected including opening files, editing/saving files, adding the files to a favorites list, pinning a file to a list and/or location in an application user interface, or otherwise accessing a file and performing activities on the file. When files are accessed in some manner, files that are arranged logically in local storage under the registered location may automatically be detected and recognized as cloud content. This may occur by determining that the path name for a file contains or is otherwise tied to a path for the local storage location that is registered for the device. For example, links to files, path names and other references to files may be parsed by the recognition module 119 to detect references that contain the registered location. Files corresponding to references that contain the registered location are then recognized as cloud content associated with a collaboration service to which the registered location belongs. Therefore, the recognized cloud content is associated with the corresponding collaboration service and treated accordingly.

Indications for display via one or more applications are output to reflect association of the recognized files with the collaboration service (block 308). For example, file system icons, list designators, text colors, shading, graphics, animations and/or other indications representing collaboration services may be presented to show that content items are associated with respective collaboration services. Thus, a recently used documents list or other activity list may include icons representing collaboration services with particular list items to indicate association of these items with respective collaboration services. In another example, custom collaboration service icons/graphics may be employed by an operating system, file systems, and/or various applications of a device to show associations of files and folders with particular collaboration services. Thus, even though a cloud content document may correspond to a particular client application, such as a word processing or spreadsheet program, a custom icon indicative of a collaboration service may be used to represent the document rather than using an icon designated for files of the particular application. The particular icon or other indicator to use for identification of a particular collaboration service may be provided via metadata that is stored along with a registered location. In this way, a user may be able to quickly distinguish cloud content from other content of a device based on visual indications that may be provided with cloud content.

Figure 4:
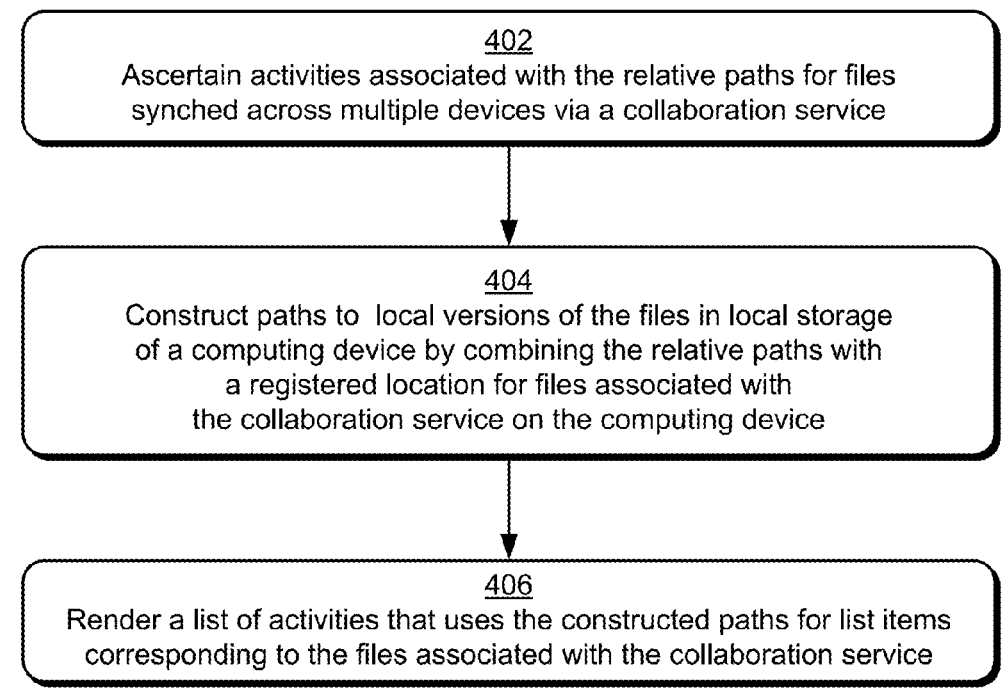
FIG. 4 is a flow diagram depicting an example procedure to construct paths for activities with recognized cloud content using relative paths in accordance with one or more embodiments.

FIG. 4 is a flow diagram depicting a procedure 400 in which paths for activities with recognized cloud content are constructed using relative paths. Activities are ascertained that are associated with relative paths for files synched across multiple devices via a collaboration service (block 402). This may occur in any suitable way. In one approach, a local activities list 202 of a client device may be synched to a server activities list 210 that represents activities with files performed across multiple devices. This may involve editing the activities list 202 to reflect changes, downloading the server activities list 210 to replace the local version, and so forth. In at least some embodiments, the server activities list 210 may be accessible via a corresponding client account. Local activities lists 202 of multiple devices may also be synched one to another in a peer-to-peer manner without relying upon a server activities list 210.

Paths are constructed to local versions of the files in local storage of a computing device by combining the relative paths with a registered location for files associated with the collaboration service on the computing device (block 404). Here, relative paths may be retrieved from the synched activities list 202 and combined with a registered location 204 that is recorded to a designated data object, such as a registry entry. An application may be configured to look-up or otherwise obtain the registered location 204 by reference to the designated data object. The registered location 204 may be added (e.g., pre-pended) to the relative paths to form full paths that are appropriate for files stored locally by the computing device.

As mentioned, multiple registered locations corresponding to the same or different collaboration services may be registered on a device in some scenarios. If multiple registered locations are employed, service identifiers and/or path identifiers associated with the registered locations and relative paths may be used to match items to appropriate registered locations. The service identifiers correspond to top-level paths for different services, whereas the path identifiers correspond to multiple sub-paths or folders that may be registered in connection with a single service. Thus, metadata associated with relative paths may include numeric or other identifiers that indicate a particular service, path, and/or place to obtain a corresponding registered location. The identifiers may correspond to a position in a registry, list, a database record, or other data object where multiple registered locations are maintained. Thus, a full path for an item may be constructed by looking-up a registered location from a position designated by an identifier that is associated with the relative path for the item and combining the registered location from the position with the relative path for the item.

A list of activities is rendered that uses the constructed paths for list items corresponding to the files associated with the collaboration service (block 406). In other words, items for recognized cloud content included in the rendered lists are rendered using the constructed paths. This may include showing the path in the list and/or configuring links to items in the list to use the constructed paths.

FIG. 5 is a flow diagram depicting a procedure 500 in which activities for recognized cloud content are roamed between devices. A designated location is established for synched files associated with a collaboration service in local storage at a computing device (block 502). For instance, a registry entry or other suitable data object may be implemented to store a registered location at a device for files associated with a particular collaboration service. Applications may be configured to reference the registered location to implement activity roaming between devices and distinguish between "offline" local files and cloud content that is synched with other devices.

Activities are tracked that correspond to the synched files on the computing device using relative paths to the files at the designated location (block 504). Here, various activities performed upon or with synched files may be tracked. As discussed, synched files associated with designated locations for collaboration services may be recognized as cloud content. Based on this recognition, activities corresponding to the synched files (e.g., cloud content) may be stored using relative paths to the files. The relative paths may be constructed by referencing the registered location and removing the path for the registered location from the full path for files. Thus, a database or list that relates various activities to relative paths for synched files may be formed.

A list of activities including the relative paths of the synched files is roamed to another computing device to enable the other computing device to match the activities to corresponding synched files located at specific locations in local storage of the other computing device (block 506). Here, a list of activities formed at one device may be synched to other devices. The list may be indicative of recent interaction of a user with files such as to edit or otherwise manipulate a document, add items to a favorites list, pin items to a user interface and so forth. These and other activities may be related to files using the relative paths described previously herein. The activities list may be uploaded via a collaboration service and optionally stored as a server activities list. Other devices may access and/or download the activities list from the server or directly device-to-device via the collaboration service. This enables devices to synchronize their activities lists one to another.

A device may use the relative paths associated with activities performed by another device to versions of synched files stored locally. In one approach, full paths to local versions of synched files may be constructed by adding a registered location for a device to the relative paths used in activities list. In this way, each individual device may create a device specific activities list that uses constructed paths (e.g., combinations of registered paths and relative paths) to correctly reference local versions of synched files.

Having considered some example procedures, consider now a discussion of an example user interface for interaction with recognized cloud content in accordance with one or more embodiments.

Example User Interface

Figure 6:
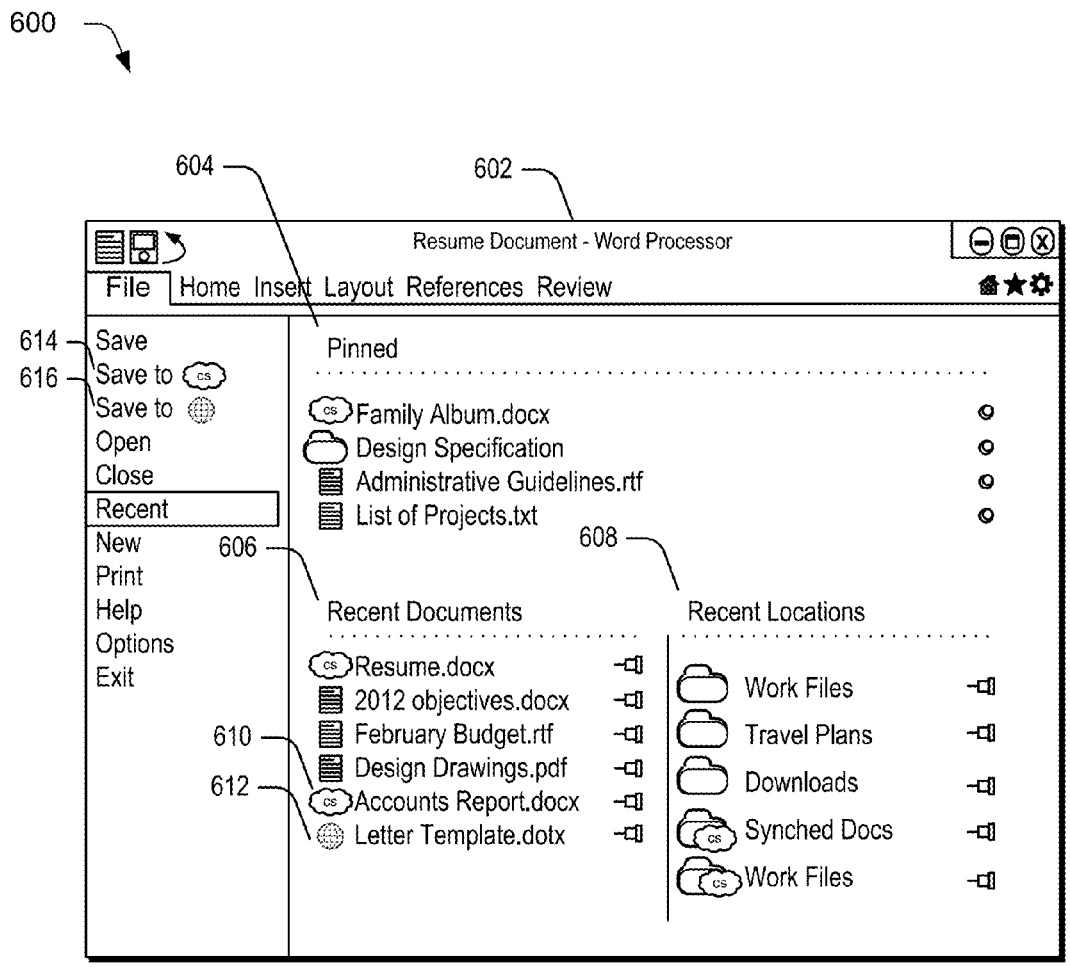
FIG. 6 is diagram depicting an example user interface for interaction with cloud content in accordance with one or more embodiments.

FIG. 6 depicts generally at 600 an example user interface 602 for an application the enables various custom interactions with recognized cloud content. In this example, the user interface is depicted as an interface for a word processor application. In particular, a page configured to display a pinned items list 604, a recent documents list 606, and a recent locations list 608 for the word processor application is presented. The page may be exposed responsive to a selection of a "Recent" menu item (as illustrated), selection of a navigation control, when the application is launched, or otherwise.

In accordance with techniques described herein, items in the example lists may include items corresponding to activities that are roamed between devices using relative paths. Items in the list may also be selectable to navigate and render corresponding documents. As such, the items in the lists may be associated with links to local storage locations of corresponding documents. For roamed items, paths for the links may be constructed by combining relative paths with a registered location as previously described.

As also discussed previously, recognized cloud content may be rendered in connection with visual identifiers to show association of the cloud content with corresponding cloud services. Various types of identifiers are contemplated such as icons, animations, shading, coloration and/or other visual graphics and effects suitable to distinguish cloud content items/documents from other items/documents. Such identifiers of cloud content may be employed wherever list items, graphics, links and other references to cloud content appear on a device. This may include various representations of recognized cloud content provided in file lists exposed within user interfaces for the operating system, a file manager program, and other applications of a device, as desktop items (e.g., file or folder icons), and/or with pinned items, to name a few examples. In other words, visual identifiers for recognized cloud content may be employed throughout the user experience provided by a device.

For example, default icons may be changed to service specific icons for recognized cloud content. In the depicted example, a cloud icon 610 is used with multiple listed items to represent that these items are cloud content from a particular collaboration service. For folder locations in the recent locations list 608, the cloud icon 610 is shown as being incorporated with a folder icon. A globe icon 612 is also shown in relation to a letter template item in the recent documents list 606. The globe icon 612 may correspond to another, different collaboration service with which the letter template is associated. Thus, a variety of visual identifiers may be employed within an application user interface (and elsewhere on a device) to show associations of content with one or more collaboration services.

In some embodiments, activity lists that are roamed to a device may include items corresponding to a service that is not available (e.g., not installed) on the device. For example, assume that the letter template presented with the globe icon 612 is associated with a collaboration service that is not installed on or is otherwise not available on the device. The item may still be recognized as cloud content. To do so, metadata and/or other identifiers may be referenced from a roamed activities list. This data enables the device to recognize that the content corresponds to a particular collaboration service and determine that a path is not registered for the particular collaboration service.

Cloud content that is recognized as being associated with an unavailable service may be handled in various ways. In one approach, the content may be ignored and/or may not be shown within activities lists. Alternatively, items may appear as unavailable or inactive items in the lists such as by disabling links, "graying out," and/or or otherwise configuring and presenting the items as unavailable. In addition or alternatively, a notification that a file/service is unavailable and/or prompt to install a corresponding service may be output responsive to selection of an item associated with an unavailable service. Thus, if the letter template in the above example is selected, a prompt may appear giving a notification and/or selectable option to install a corresponding collaboration service to enable the user to access the related document. A selectable option to install may be configured using a URL that is provided as metadata associated with a relative path or registered location as discussed previously.

Other customizations of an application user interface for cloud content are also contemplated. For example, controls to access and/or save items to cloud content locations may be incorporated within the user interface 602 as menu items, selectable buttons, and so forth. In one approach, an application may look-up registered services when the applications loads and customize the user interface accordingly to add functionality or otherwise modify the user interface to include custom features corresponding to registered services that are discovered. Service may be discovered by referencing registered locations for the services stored via registry entries or other suitable designated data objects as discussed herein. The modification of functionality to accommodate recognized cloud content is illustrated in FIG. 6 by custom save to menu items 614 and 616 corresponding to different collaboration services. The custom save to menu items 614 and 616 may be added to the menu when registered locations for the collaboration services are discovered.

Naturally, a variety of different types of custom functionality and controls may be enabled within an application user interface for recognized cloud content of which the depicted save to menu items 614 and 616 are representative examples. Other examples may include, but are not limited to, links to open folders corresponding to a collaboration service, a hyperlink to a website for one or more collaboration services, a collaboration service configuration and settings page, auto-save options for discovered services, and so forth.

Having considered an example user interface, consider now a discussion of an example system and components of the system that can be employed to implement embodiments of the techniques for recognizing cloud content described herein.

Example System and Device

Figure 7:
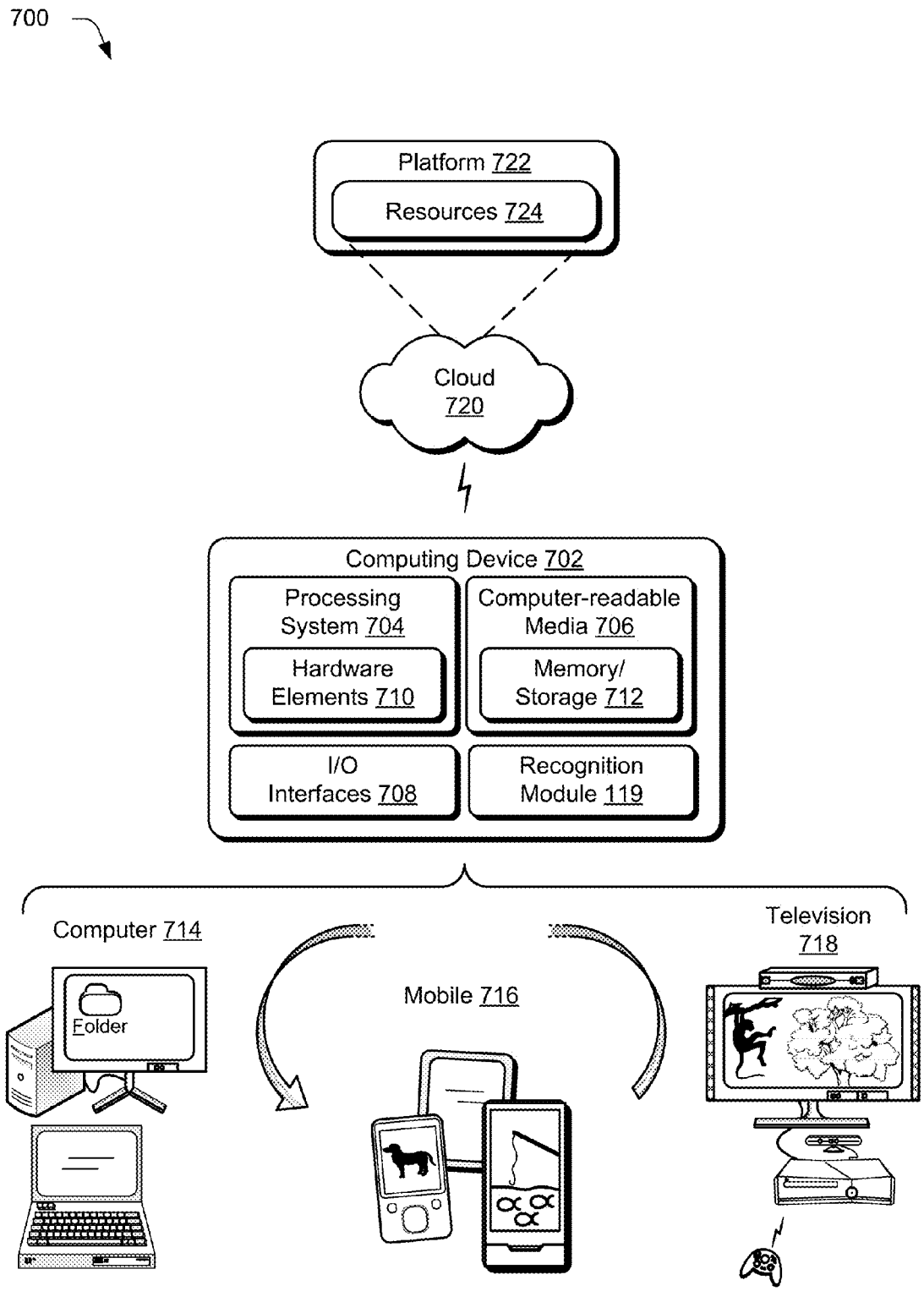
FIG. 7 illustrates various an example system that can be employed to implement embodiments of the techniques described herein.

FIG. 7 illustrates an example system generally at 700 that includes an example computing device 702 that is representative of one or more computing systems and/or devices that may implement the various techniques described herein. The computing device 702 may be, for example, a server of a service provider, a device associated with the client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 702, such as via a network. Communication media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including applications 112, file synch module 114, recognition module 119, resource manager 120, collaboration service 126 and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This is illustrated through inclusion of the recognition module 114 on the computing device 702. The functionality of the recognition module 114 and other modules may also be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device comprising:
   registering a top level path name for a local storage location on the computing device;
   associating user files stored under the top level path name with a collaboration service;
   detecting the files stored locally under the top level path name;
   recognizing the detected files as cloud content associated with the collaboration service;
   tracking activities of one or more applications of the computing device with the recognized files, the tracking using relative paths formed by removing the registered to level path name from absolute paths to the files in the local storage; and
   outputting indications for display via the one or more applications of the computing device to reflect association of the recognized files with the collaboration service, the indications providing one or more visual identifiers distinguishing files associated with the collaboration service from other content not associated with the collaboration service.

2. The method as described in claim 1, wherein registering the top level path name for a local storage location comprises storing the top level path name for a local storage location via a data object designated for registration of locations for files associated with collaboration services.

3. The method as described in claim 2, wherein the data object comprises a file system configuration and settings entry.

4. The method as described in claim 1, wherein the files comprise synchronized offline files with versions stored locally on multiple devices to which the files are synchronized.

5. The method as described in claim 1, wherein the indications comprise icons representing the collaboration service for display with corresponding items presented in an activities list.

6. The method as described in claim 1, wherein detecting files associated with the registered top level path name comprises parsing references to the files to detect references that contain the registered top level path name.

7. The method as described in claim 1, wherein the one or more applications comprise a productivity suite that integrates multiple office productivity modules.

8. The method as described in claim 1,
   wherein tracking the activities using the relative paths further comprises detecting processing actions performed by the one or more applications of the computing device and adding an item that describes the processing action for the particular recognized file in an activities list.

9. A system comprising:
   a computing device;
   one or more processors; and
   one or more computer-readable storage devices comprising instructions that, when executed by the one or more processors, implement a recognition module configured to perform operations comprising:
   associating files stored in a registered location on the computing device with a collaboration service;
   recognizing the files associated with the collaboration service as cloud content;
   obtaining a relative path for the files stored on the computing device by removing the registered location from absolute paths to the files in the local storage;
   tracking activities of one or more applications with the files recognized as cloud content using the relative paths;
   ascertaining activities associated with the relative paths for files synchronized across multiple devices via the collaboration service;
   constructing paths to local versions of the files in local storage of the computing device by combining the relative paths with the registered location for files associated with the collaboration service registered on the computing device; and
   rendering a list of activities that uses the constructed paths for list items corresponding to the files associated with the collaboration service.

10. The system as described in claim 9, wherein the recognition module is further configured to perform operations comprising:
    roaming, via the collaboration service, the list of the activities for the recognized files using the relative paths to enable other devices to match the activities to corresponding versions of the recognized files in local storage of the other devices.

11. The system as described in claim 9, wherein the recognition module is further configured to perform operations comprising: recording the registered location for files associated with the collaboration service via a designated data object when the collaboration service is activated on the computing device.

12. The system as described in claim 9, wherein:
    the relative paths include a service identifier corresponding to the collaboration service; and
    constructing the paths to local versions of the files further comprises: looking-up the registered location based on the service identifier; and replacing the service identifier in the relative paths with the registered location.

13. The system as described in claim 9, wherein the activities include indications of recently used documents across the multiple devices for inclusion in a recently used documents list output at the computing device.

14. The system as described in claim 9, wherein the activities include indications of files that have been pinned to user interfaces of an application across the multiple devices to enable pinning of corresponding files within a user interface for the application output at the computing device.

15. The system as described in claim 9, wherein rendering the list of activities comprises presenting a visual indication representing the collaboration service with the list items corresponding to the files associated with the collaboration service.

16. The system as described in claim 9, wherein the recognition module is further configured to perform operations comprising:
   recognizing that an activity list synched between the multiple devices contains at least one item associated with a particular collaboration service that is unavailable on the computing device by determining that a path for the particular collaboration service is not registered at the computing device; and
   outputting a notification to install the particular collaboration service at the computing device to access the at least one item.

17. A system comprising:
   a computing device; and
   one or more processors configured to perform operations to handle recognized cloud content of the computing device including:
   registering a top level path name for a local storage location on the computing device;
   associating user files stored under the top level path name with a collaboration service;
   detecting the files stored locally under the top level path name;
   recognizing the detected files as cloud content associated with the collaboration service;
   tracking activities of one or more applications of the computing device with the recognized files, the tracking using relative paths formed by removing the registered top level path name from absolute paths to the files in the local storage; and
   outputting indications for display via the one or more applications of the computing device to reflect association of the recognized files with the collaboration service, the indications providing one or more visual identifiers distinguishing files associated with the collaboration service from other content not associated with the collaboration service.

18. The system as described in claim 17, wherein registering the top level path name for a local storage location comprises storing the top level path name for a local storage location via a data object designated for registration of locations for files associated with collaboration services.

19. The system as described in claim 18, wherein the data object comprises a file system configuration and settings entry.

20. The system as described in claim 17, wherein the files comprise synchronized offline files with versions stored locally on multiple devices to which the files are synchronized.

* * * * *